(12) United States Patent
Nadeau, Jr. et al.

(10) Patent No.: US 9,061,921 B2
(45) Date of Patent: Jun. 23, 2015

(54) WATER PURIFICATION APPARATUS AND METHOD

(71) Applicant: LyteSyde, LLC, Miami Beach, FL (US)

(72) Inventors: Bruce E. Nadeau, Jr., Las Vegas, NV (US); Kelly P. Rock, Miami Beach, FL (US)

(73) Assignee: LYTESYDE, LLC, Charlotte, NC (US)

(*) Notice: Subject to any disclaimer, the term of this patent is extended or adjusted under 35 U.S.C. 154(b) by 0 days.

(21) Appl. No.: 13/750,889

(22) Filed: Jan. 25, 2013

(65) Prior Publication Data

US 2013/0133356 A1 May 30, 2013

Related U.S. Application Data

(62) Division of application No. 12/190,878, filed on Aug. 13, 2008, now Pat. No. 8,361,281.

(51) Int. Cl.
*C02F 1/04* (2006.01)
*B01D 1/14* (2006.01)
(Continued)

(52) U.S. Cl.
CPC ... *C02F 1/04* (2013.01); *B01D 3/04* (2013.01); *B04C 3/06* (2013.01); *B04C 11/00* (2013.01);
(Continued)

(58) Field of Classification Search
CPC .......... B01D 1/14; B01D 1/0082; B01D 3/04; B01D 3/42; B01D 5/006; B01D 5/0051; B01D 21/267; C02F 1/04; C02F 1/048; C02F 2103/08; C02F 2209/03; B04C 3/00–3/06; B04C 11/00; B04C 2003/003; B04C 2003/006; B04C 5/14; B04C 5/081; B94C 5/24–5/30; Y10S 202/00; Y10S 203/17–203/18; Y10S 261/00

See application file for complete search history.

(56) References Cited

U.S. PATENT DOCUMENTS 3,214,348 A  10/1965  Lichtenstein
4,040,973 A   8/1977  Szivós et al.
(Continued)

FOREIGN PATENT DOCUMENTS

WO  2004108296 A1  12/2004
WO  2007013099 A1   2/2007
(Continued)

OTHER PUBLICATIONS

International Search Report, PCT/US2009/053420, Oct. 2, 2009 (1 pg.).
(Continued)

*Primary Examiner* — Virginia Manoharan
(74) *Attorney, Agent, or Firm* — Holland & Hart

(57) ABSTRACT

There is disclosed a water purification apparatus and method, related to desalinization. In an embodiment, a water purification apparatus and method includes at least one port for receiving airflow therethrough, at least one port for receiving salt water therethrough, at least one output for providing outflow of pure water vapor, and at least one output for proving outflow of a mixture of water, salt and air; and a plurality of chambers for evaporating the salt water into the airflow, at least one of the chambers forming a plurality of ports arranged in a plurality of rows. In an embodiment, a method includes providing airflow to a water purification apparatus; providing salt water to the water purification apparatus; forming a vortex in the airflow to evaporate water vapor from the salt water; and providing the water vapor in the airflow to a condenser so as to obtain pure water.

23 Claims, 16 Drawing Sheets

(51) Int. Cl.
*B01D 3/04* (2006.01)
*B04C 3/06* (2006.01)
*B04C 11/00* (2006.01)
*B04C 3/04* (2006.01)
*B01D 5/00* (2006.01)
*C02F 103/08* (2006.01)
*B01D 21/26* (2006.01)

(52) U.S. Cl.
CPC ... *B04C 3/04* (2013.01); *B01D 1/14* (2013.01); *B01D 5/006* (2013.01); *C02F 1/048* (2013.01); *C02F 2103/08* (2013.01); *B01D 21/267* (2013.01)

(56) References Cited

U.S. PATENT DOCUMENTS

| | | | |
|---|---|---|---|
| 4,362,627 | A | 12/1982 | Fly et al. |
| 5,078,880 | A | 1/1992 | Barry |
| 5,176,799 | A | 1/1993 | Roe et al. |
| 5,697,169 | A * | 12/1997 | Jacob ............... 34/393 |
| 6,110,368 | A | 8/2000 | Hopkins et al. |
| 6,699,369 | B1 | 3/2004 | Hartman et al. |
| 6,811,690 | B2 | 11/2004 | Arnaud |
| 7,832,714 | B2 * | 11/2010 | Duesel et al. ............ 261/77 |
| 7,897,019 | B2 | 3/2011 | Akers |
| 8,460,509 | B2 * | 6/2013 | Lakatos et al. ........... 159/47.3 |
| 2007/0007120 | A1 * | 1/2007 | Taylor ................. 203/1 |
| 2007/0137996 | A1 * | 6/2007 | Beckman ............. 202/158 |
| 2008/0000839 | A1 | 1/2008 | Drewelow |
| 2008/0047291 | A1 | 2/2008 | Colwell |
| 2010/0044206 | A1 * | 2/2010 | Shelley ................ 203/11 |

FOREIGN PATENT DOCUMENTS

| | | | |
|---|---|---|---|
| WO | 20070133771 | A2 | 11/2007 |
| WO | 2008051549 | A2 | 5/2008 |

OTHER PUBLICATIONS

Supplementary European Search Report for European Application No. EP09807171, mailed Jul. 1, 2014.

* cited by examiner

WATER PURIFICATION APPARATUS AND METHOD

RELATED APPLICATION

This is a divisional of U.S. Pat. No. 8,361,281, issued on 29 Jan. 2013, the disclosure of which is incorporated, in its entirety, by this reference.

BACKGROUND OF THE INVENTION

Many types of devices have been developed over the years for the purpose of converting liquids or aerosols into gas-phase fluids. Many such devices have been developed, for example, to desalinate water so as to remove excess salt and other minerals from water. Saline water, or salt water, generally contains a significant concentration of dissolved salts. Seawater has a salinity of roughly 35,000 ppm, or 35 g/L. Seawater is not potable nor suitable for irrigating crops.

Water may be desalinated in order to be converted to fresh water suitable for human consumption or irrigation. Large-scale desalination typically uses large amounts of energy as well as specialized, expensive infrastructure. As such, it is very costly to use desalinated water instead of fresh water from rivers or groundwater.

Three methods of desalination include vacuum distillation, reverse osmosis and multi-stage flash.

In vacuum distillation, water is boiled at less than atmospheric pressure. Boiling of a liquid occurs when the vapor pressure equals the ambient pressure and vapor pressure increases with temperature. Due to the reduction in temperature, energy is saved.

Reverse osmosis technology involves semi-permeable membranes and pressure to separate salts from water. Less energy may be used than thermal distillation. However, desalination remains energy intensive.

SUMMARY OF THE INVENTION

In an embodiment, there is provided a desalinization apparatus, comprising a first end and a second end in opposition to one another, a line between the first end and the second end forming an axis, the first end forming at least one port for receiving airflow therethrough and at a pressure higher than an ambient atmospheric pressure, the first end forming at least one port for receiving salt water therethrough and at a pressure higher than the ambient atmospheric pressure, the second end forming at least one output for providing outflow of pure water vapor, and the second end forming at least one output for proving outflow of a mixture of water, salt and air; and at least one tube casing extending between the first end and the second end, the tube casing enclosing a plurality of chambers for evaporating the salt water into the airflow, at least one of the chambers forming a plurality of passageways arranged substantially parallel to the axis between the first end and the second end, forming a plurality of ports from the passageways, and the ports arranged in a plurality of rows substantially parallel to one another and substantially perpendicular to the axis between the first end and the second end.

In another embodiment, there is provided a method, comprising providing airflow to a desalinization apparatus at a pressure higher than an ambient atmospheric pressure; providing salt water to the desalinization apparatus at a pressure higher than an ambient atmospheric pressure; forming a vortex in the airflow to evaporate water vapor from the salt water; and providing the water vapor in the airflow to a condenser so as to obtain pure water.

Other embodiments are also disclosed.

BRIEF DESCRIPTION OF THE DRAWINGS

The accompanying drawings illustrate certain embodiments discussed below and are a part of the specification.

Throughout the drawings, identical reference characters and descriptions indicate similar, but not necessarily identical elements.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the words "including" and "having," as used in the specification, including the claims, have the same meaning as the word "comprising."

Figure 1:
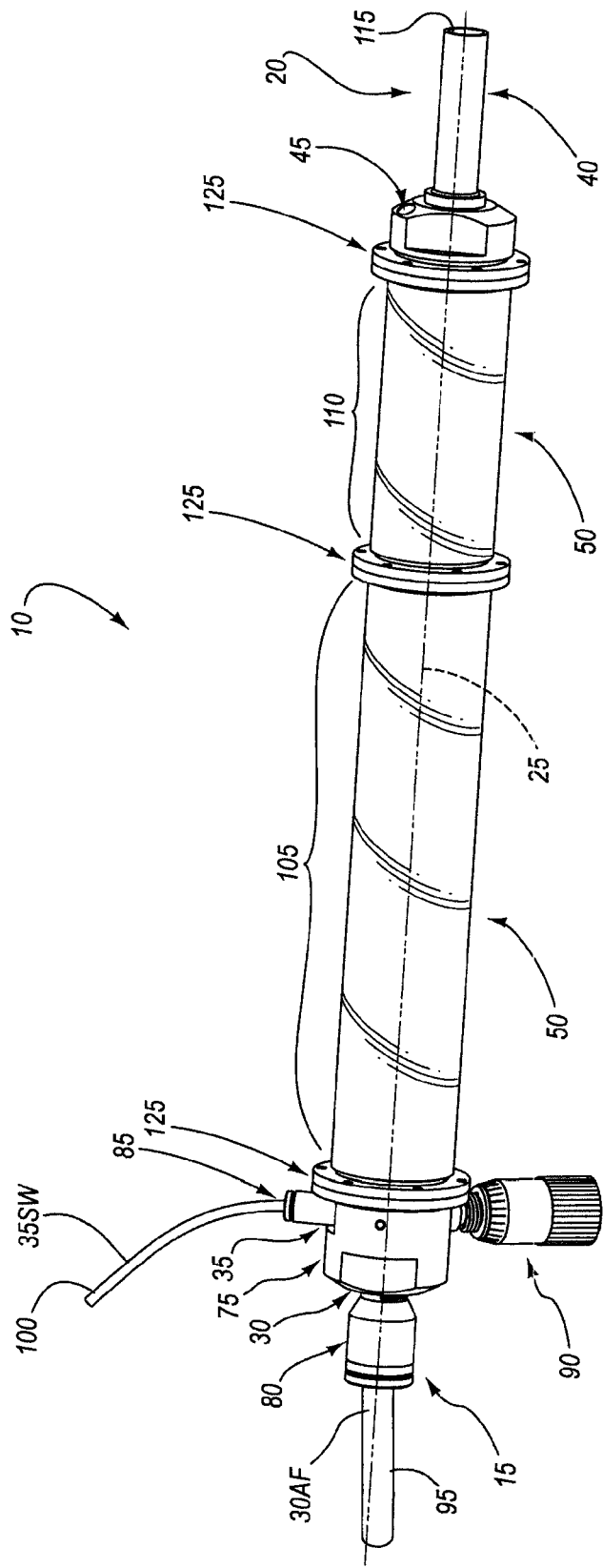
FIGS. 1-3 illustrate perspective views of a desalinization apparatus.
Figure 2:
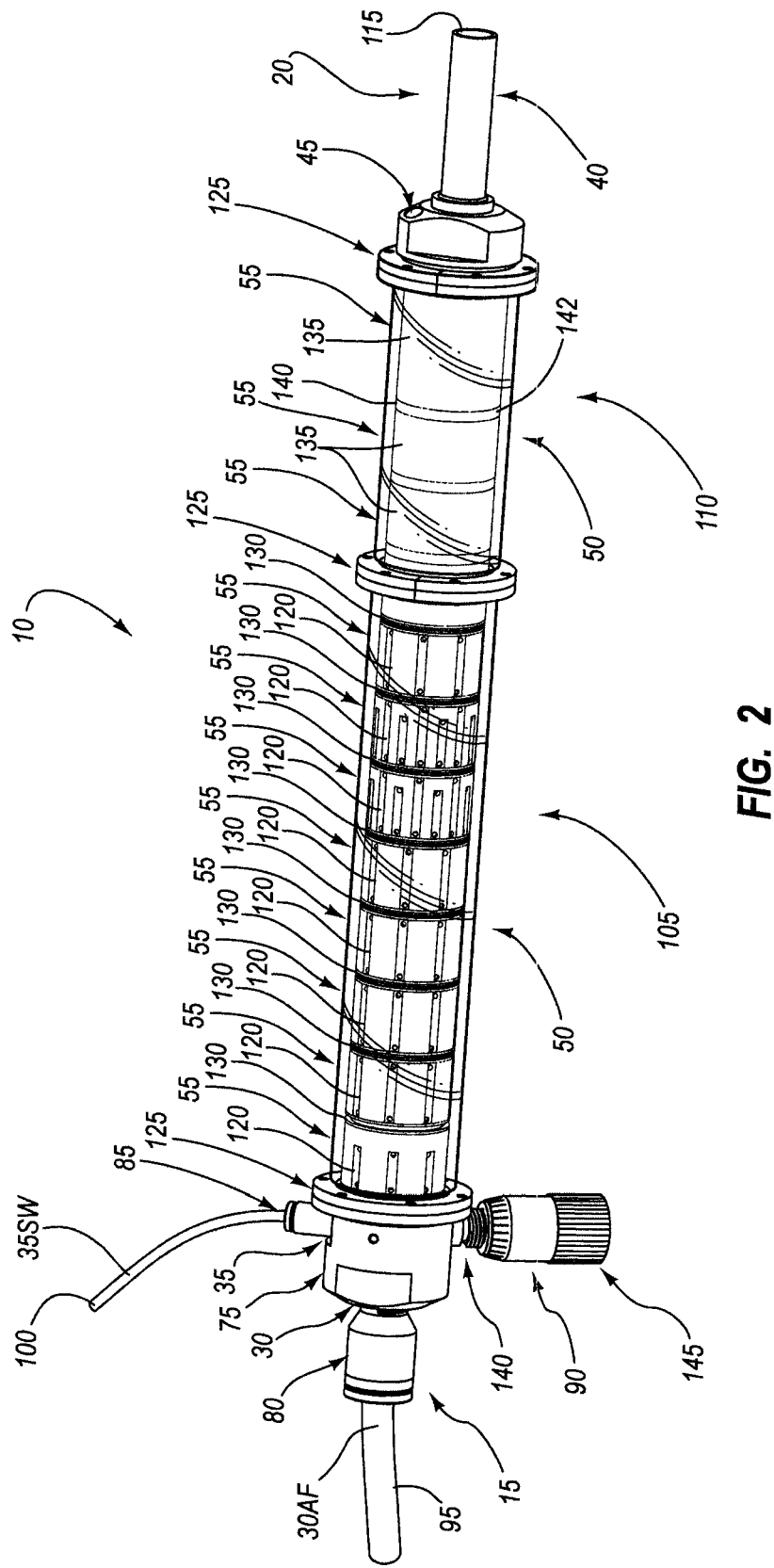
Figure 3:
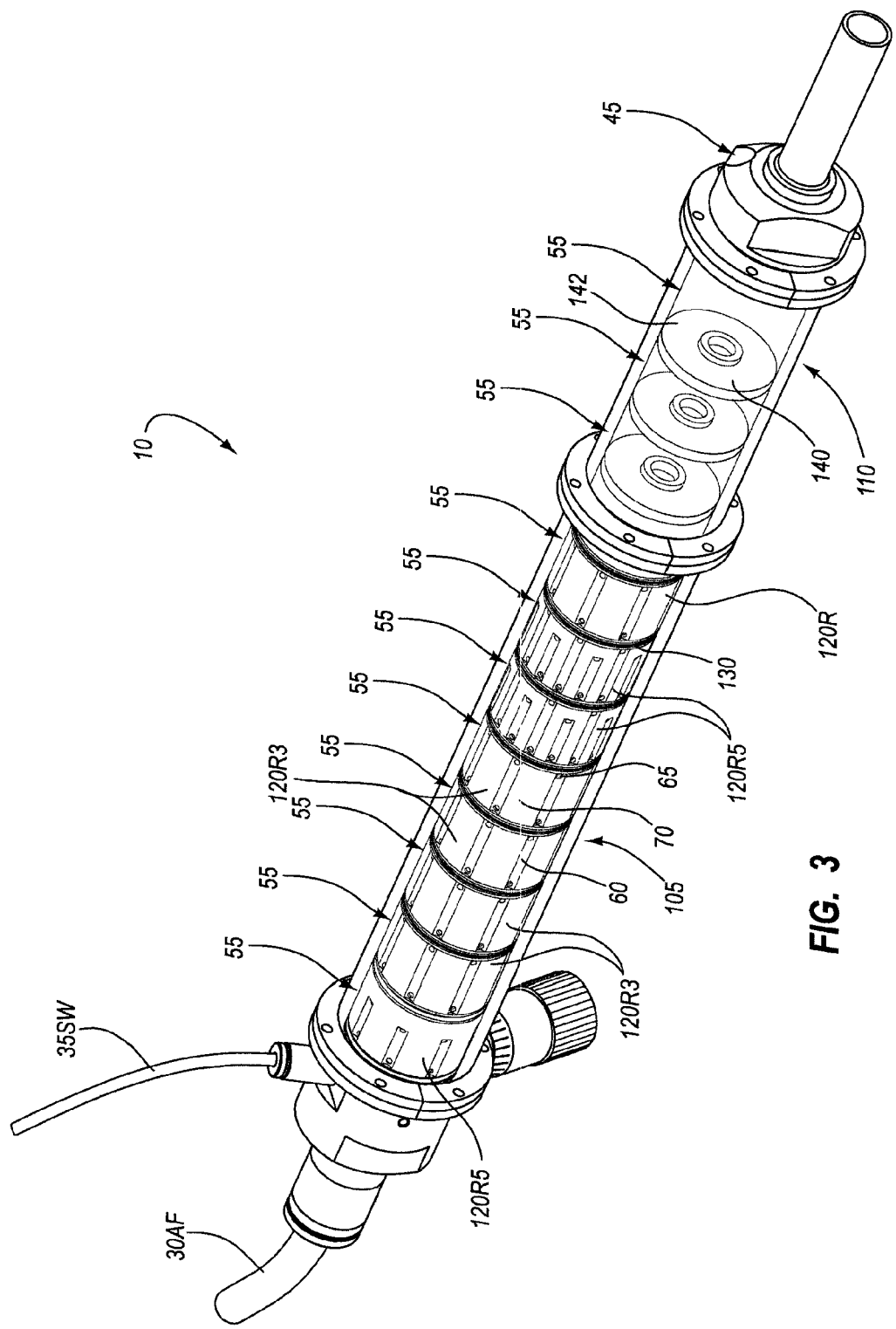
Figure 4:
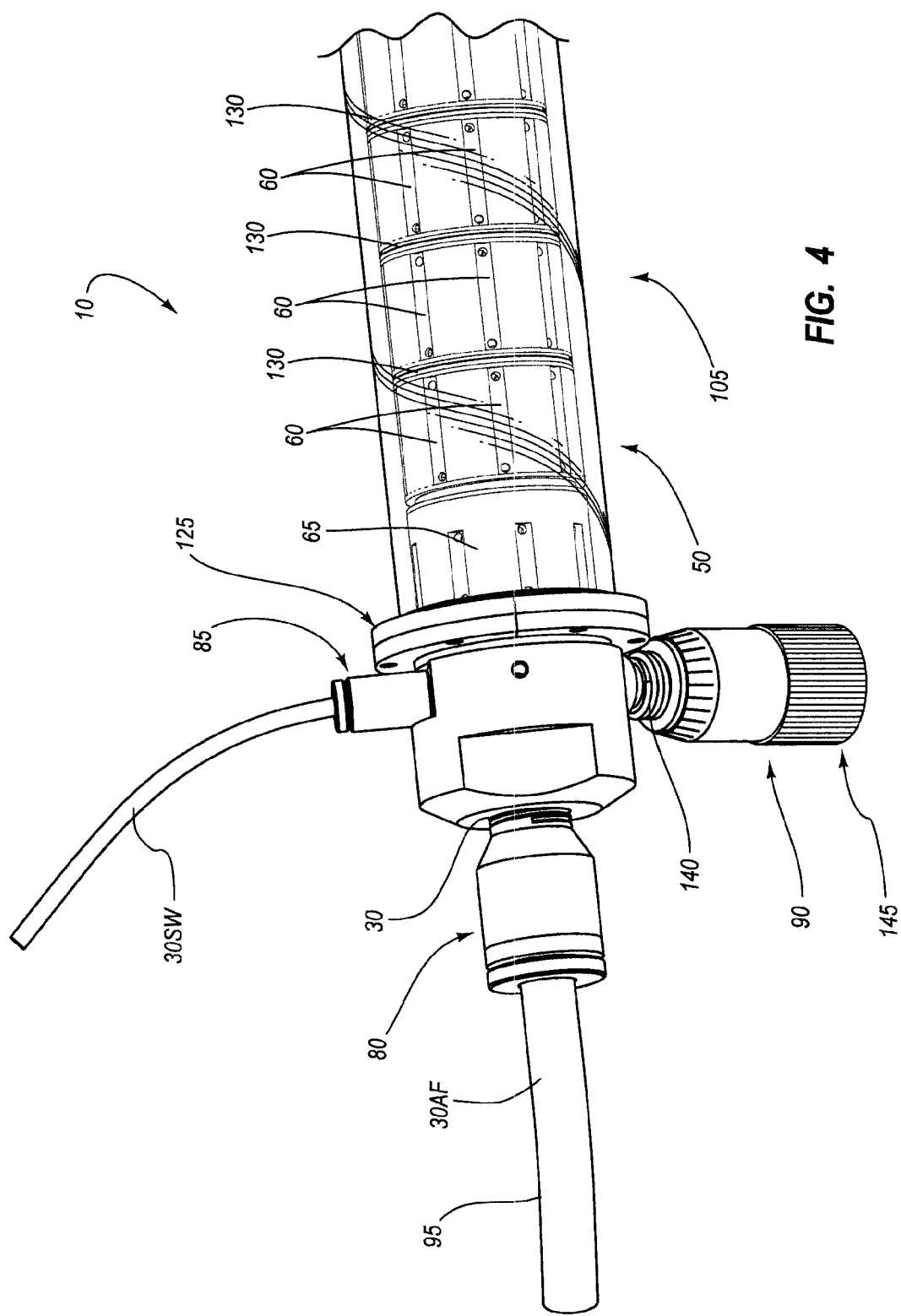
FIG. 4 illustrates the input portion of the desalinization device shown in FIGS. 1-3.
Figure 5:
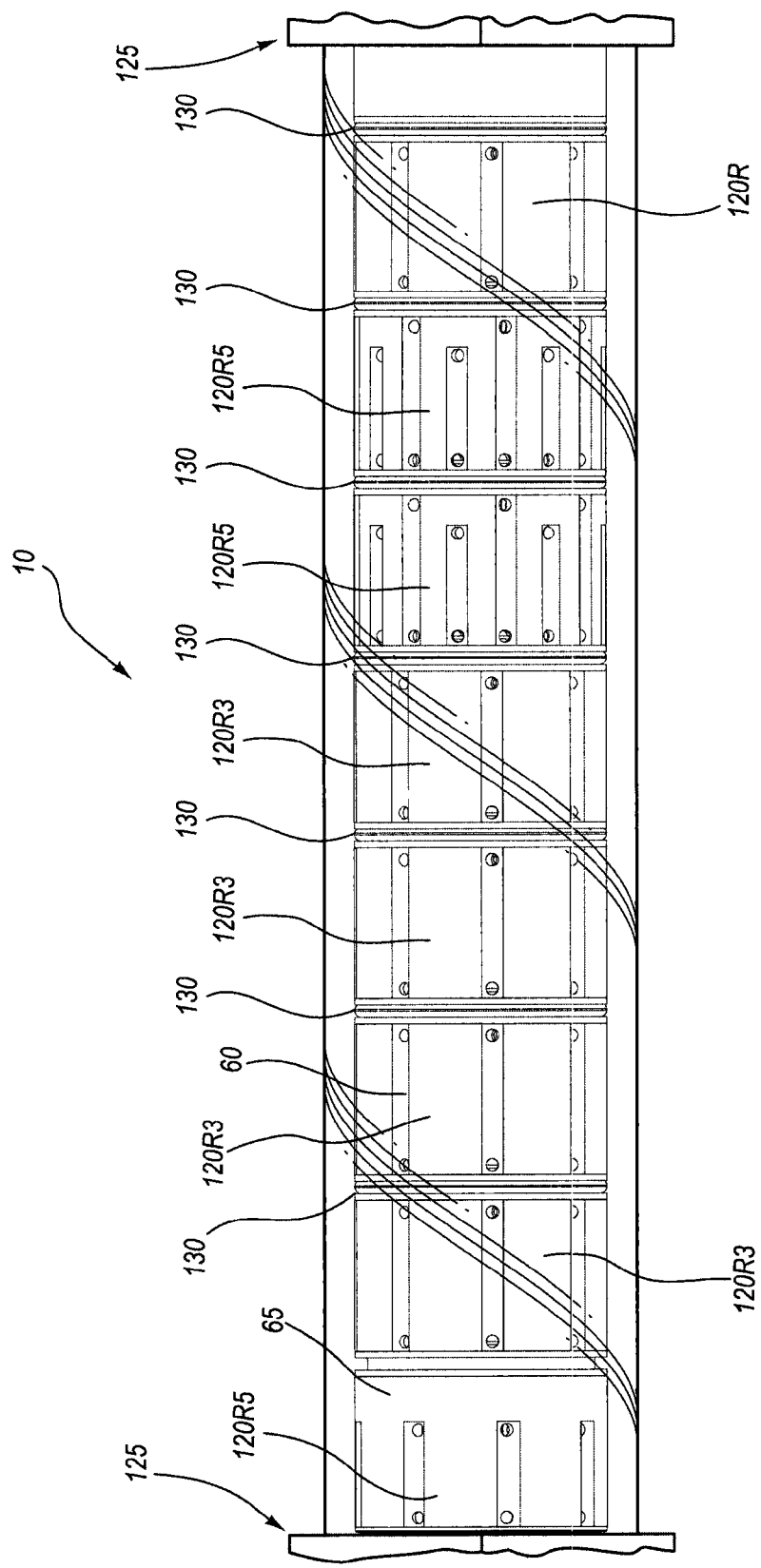
FIG. 5 illustrates an enlarged view of processing chambers in a processing section of the desalinization apparatus shown in FIGS. 1-3.

Turning now to the figures, and in particular to FIGS. 1-3, embodiments of a desalinization apparatus 10 are shown. For example, there may be provided a first end 15 and a second end 20 in opposition to one another. A line between first end 15 and the second end 20 forming an axis 25 (FIG. 1). First end 15 may form at least one port 30 for receiving airflow 30AF therethrough and at a pressure higher than an ambient atmospheric pressure. First end 15 may form at least one port 35 for receiving salt water 35SW therethrough and at a pressure higher than the ambient atmospheric pressure. Second end 20 may form at least one output 45 for providing outflow of pure water vapor, and the second end forming at least one output for proving outflow of a mixture of water, salt and air.

There may be provided at least one tube casing 50 extending between first end 15 and the second end 20. Tube casing 50 may enclose a plurality of chambers 55 (see FIGS. 2 and 3) for evaporating salt water 35SW into airflow 30AF, at least one of the chambers 55 may form a plurality of passageways 60 arranged substantially parallel to axis 25 between first end 15 and second end 20. A plurality of ports 65 from passageways 60 may be formed in at lease one of the chambers 55. Ports 65 may be arranged in a plurality of rows 70 substantially parallel to one another and substantially perpendicular to axis 25 between first end 15 and second end 20.

Still referring to FIGS. 1-3, first end 15 may include an input body 75 having an airflow connector 80, a fluid connector 85, and a valve assembly 90. Airflow connector 80 may be configured to receive tubing 95 for airflow 30AF provided thereto. Fluid connector 85 may be configured to receive tubing 100 for salt water 35SW provided thereto. Valve assembly 90 is configured to regulate flow of salt water 35SW provided thereto.

Airflow and salt water input may be adjusted for efficient evaporation within the desalinization apparatus. For example, airflow connector 80 may be configured to provide airflow 30AF at a pressure of about 80 psi into desalinization apparatus 10. Airflow connector 80 may be configured to provide airflow 30AF at a volume of about 10 to 50 cubic feet per minute (cfm.) Airflow connector 80 may be configured to provide airflow 30AF at a temperature of about 100° to 150° F.

Fluid connector 85 may be configured to provide salt water 35SW at a pressure of about 5 to 10 psi greater than the pressure of the airflow so as to provide a pressure differential to allow salt water 35SW to enter the airflow. In one embodiment, desalinization apparatus 10 may provide at least 10 ml per minute of water from the pure water vapor. In another embodiment, desalinization apparatus 10 may provide at least 13.5 ml per minute of water from the pure water vapor.

Output may provide to a passageway 115 in communication with a refrigerator to condense the water vapor into salt-free water. In one embodiment, output 45 may be configured for providing outflow of a mixture of water, salt and air is configured to provide the mixture to a separator bottle to further process the mixture into salt-free water. Referring to FIGS. 1-3, tube casing 50 may include a processing section 105 and a separator section 110 in fluid communication with one another. Processing section 105 may be configured to receive airflow 30AF and salt water 35 SW from first end 15. Processing section 105 may be configured to evaporate at least a portion of the salt water 35SW prior to the separator section 110. Separator section 110 may be configured to discharge water vapor to a passageway 115 in communication with a refrigerator to condense the water vapor into salt-free water and discharge a mixture of water, salt and air into a separate passageway 45 from the passageway 115 in communication with the refrigerator.

In order to evaporate water from the salt water into the airflow, processing section 105 directs the airflow and the salt water through ports 65 of chambers 55 to form at least one vortex about axis 25 so as to evaporate water vapor from the salt water into the airflow. For example, one or more processors in the device may be configured to create a pressure drop in the direction of airflow, and this pressure drop evaporates liquid into the airflow. In an exemplary embodiment, each of eight processors may provide a pressure drop so as to evaporate liquid. The pressure drop per processor may be within a range of 0.75 to 4 pounds per square inch (psi). In one embodiment, the plurality of chambers 55 forming processing section 105 may include different types of v-cups 120. The different types of v-cups 120 include a restrictive v-cup 102R, a 3 row v-cup 120R3, and a 5 row v-cup 120R5. Restrictive v-cup 120R may be configured to create a pressure drop of airflow 30AF and salt water 35SW therein. This increases pressure prior to restrictive v-cup 120R toward the first end 15 and allows airflow 30AF to hold additional water vapor. Processing section 105 may be configured to maximize evaporation of the salt water 35SW prior to the separator section 110.

Separator section 110 may be configured to prevent salt from being discharged from output 40 for providing outflow of pure water vapor. In an embodiment, processing section 105 may be configured to provide additional evaporation of the salt water prior to the second end 20.

One or more flanges 125 may be provided to connect processor section 105 and separator section 110 to input body 75 and output 40, respectively, as together with one another. In various embodiments, flanges 125 may be removable for cleaning or repairing desalinization apparatus 10. In alternative embodiments, flanges 125 may be integrally formed with tube casing 50 or omitted from desalinization apparatus 10.

As best illustrated in FIGS. 2 and 3, a ring 135 may be provided between beach of the chambers 55 around the distal end of each of the v-cups 120 (toward second end 20 of desalinization apparatus 10.) Ring 135 may be formed of a resilient material to function as a removable gasket. In other embodiments, chambers 55 may be formed in other fluid tight manners with respect to one another.

Figure 6:
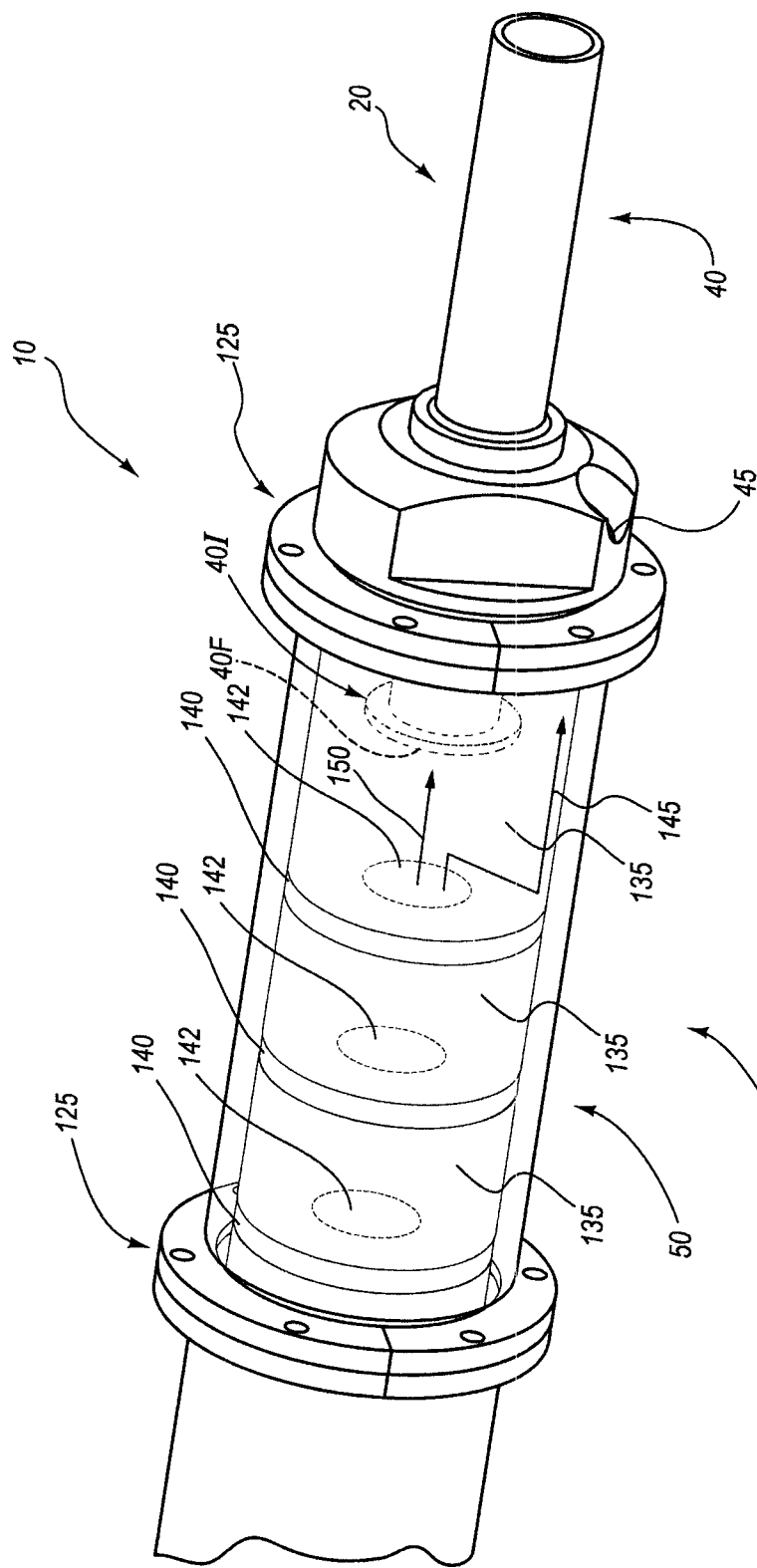
FIGS. 6 and 7 illustrate enlarged, perspective views of separator chambers in a separator section of the desalinization apparatus shown in FIGS. 1-3.
Figure 7:
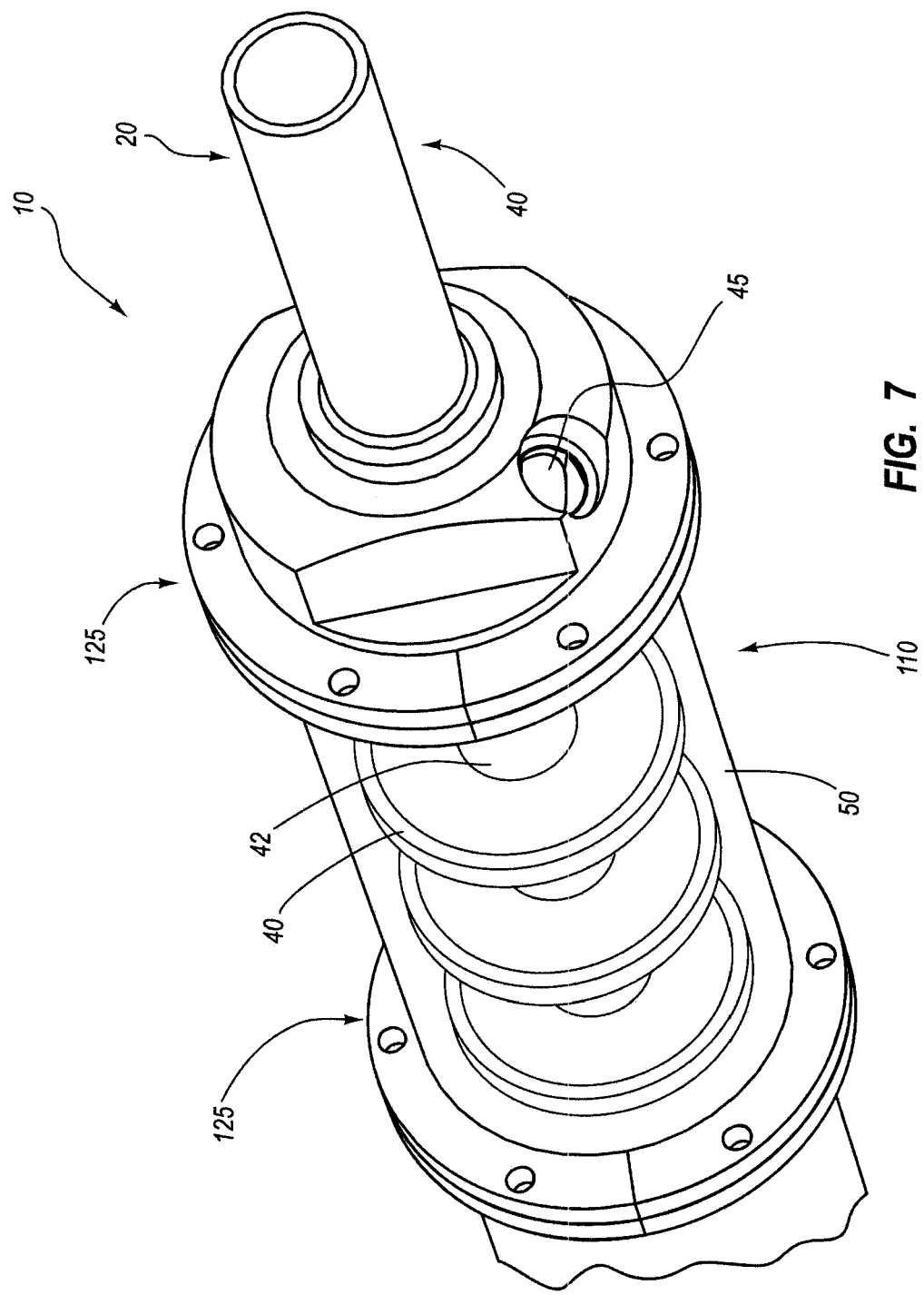

Referring to FIG. 6, there is shown a series of separator chambers 135. In an embodiment, one or more separator chambers 135 may be formed with partitions 140. An outlet 142 may be provided through each one of the partitions 140. Within separator chamber 135, flow of water with salt will generally follow path 145 and water vapor will generally follow path 150. The radius of outlets 142 creates these paths 145, 150 so as to prevent salt from entering output 401. This configuration of the output 401 with a flange 40F avoids mixing of paths 145, 150 and allows collection of sediment, salt, and any other non-vapor materials to be separately collected through passageway 45. These materials pass through second end 20 and may be separately processed. Without flange 40F at outlet 401, materials within path 145 may mix with path 150 so as to contaminate the water vapor within path 150. Looking now at FIG. 7, there is shown a perspective view of second end 20 with output 40 for water vapor. FIG. 7 illustrates output 45 for salt water and other contaminants.

Figure 8:
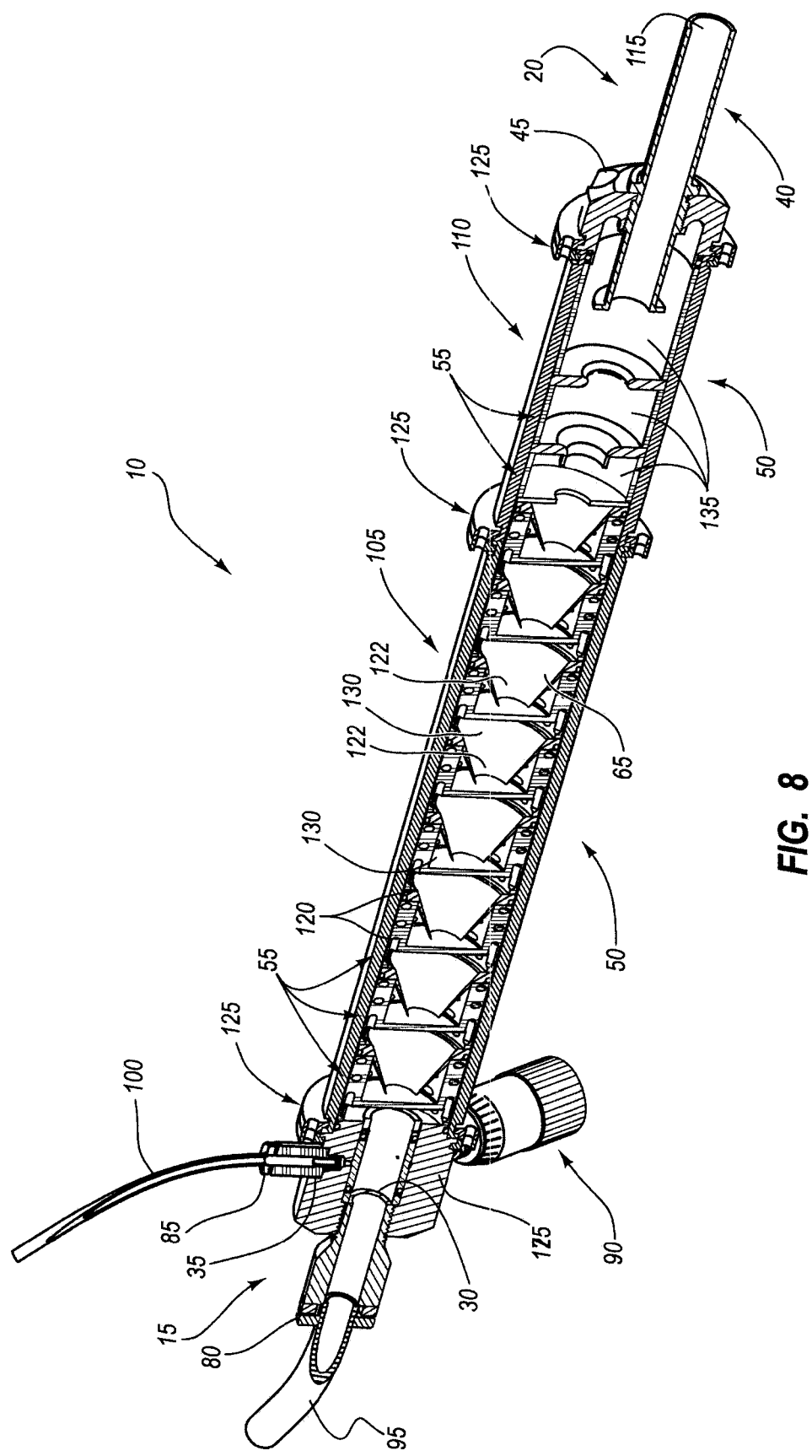
FIG. 8 illustrates a cross-sectional view of the desalinization apparatus shown in FIG. 1.

FIG. 8 illustrates a cross-sectional view of desalinization apparatus 10. Chambers 55 are shown with outlets 122 leading from a portion toward first end 15 to a subsequent chamber or separator section 110 toward second end 20. As described above, a vortex may be formed in each one of chambers 55 by airflow through the plurality of ports 65. Airflow together with salt water and any water vapor is received into each chamber 55 through passageways 60 from a portion toward first end 15 into the plurality of rows 70. After traveling though ports 65 and forming a vortex, airflow continues to travel toward second end 20 through outlet 122.

Figure 10:
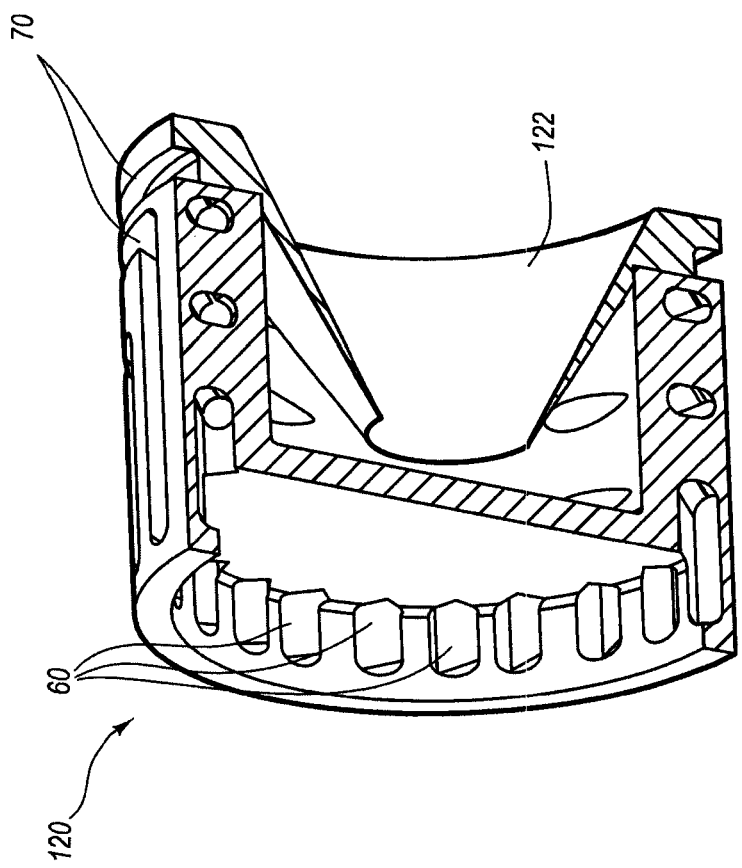
FIGS. 9-16 illustrate various cross-sectional views of v-cup configurations within the chamber of processing section of the desalinization apparatus shown in FIGS. 1-3.
Figure 9:
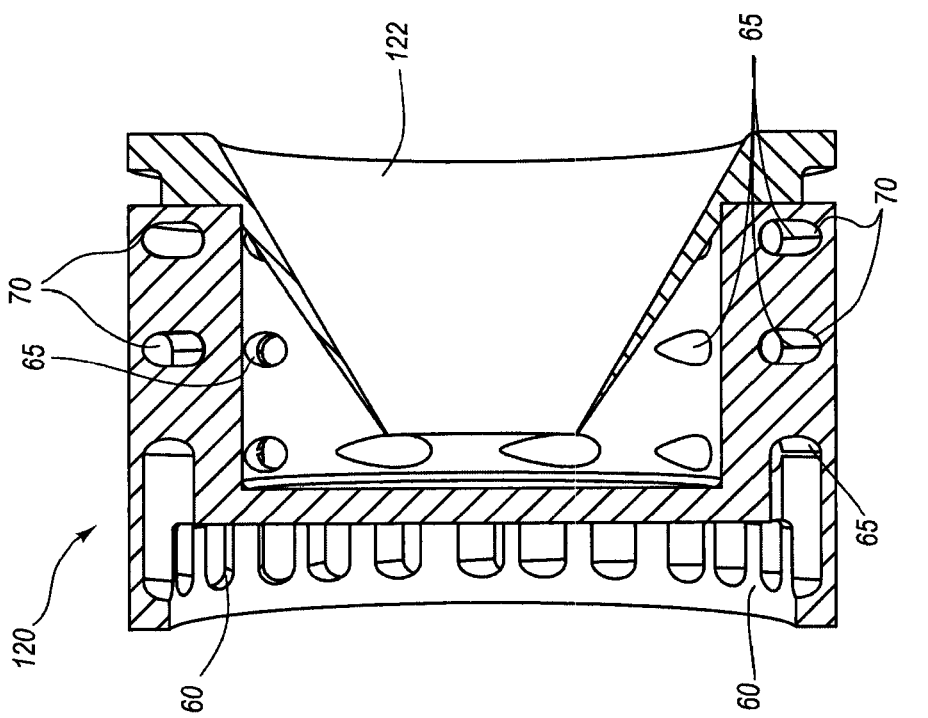

An exemplary embodiment of this configuration can also be seen in FIG. 9. From left to right, in the same direction as illustrated in FIGS. 1-8, airflow carrying salt water, together with any particulate matter and vapor, enters v-cup 120 through passageways 60. Airflow is next directed through a plurality of ports 65 to form a vortex. Airflow subsequently emerges from outlet 122 for processing within another v-cup 120 or separator section 110. FIG. 10 illustrates airflow passageways 60 and rows 70 in an orthogonal relationship with one another. Alternatively, passageways 60 and rows 70 may be configured at another angle with respect to one another.

Figure 12:
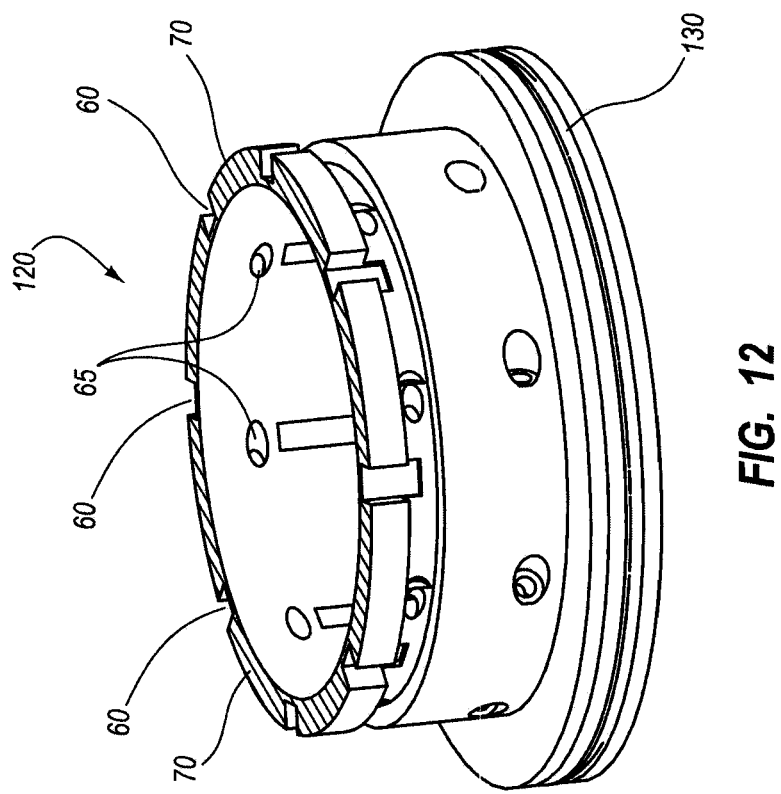
Figure 11:
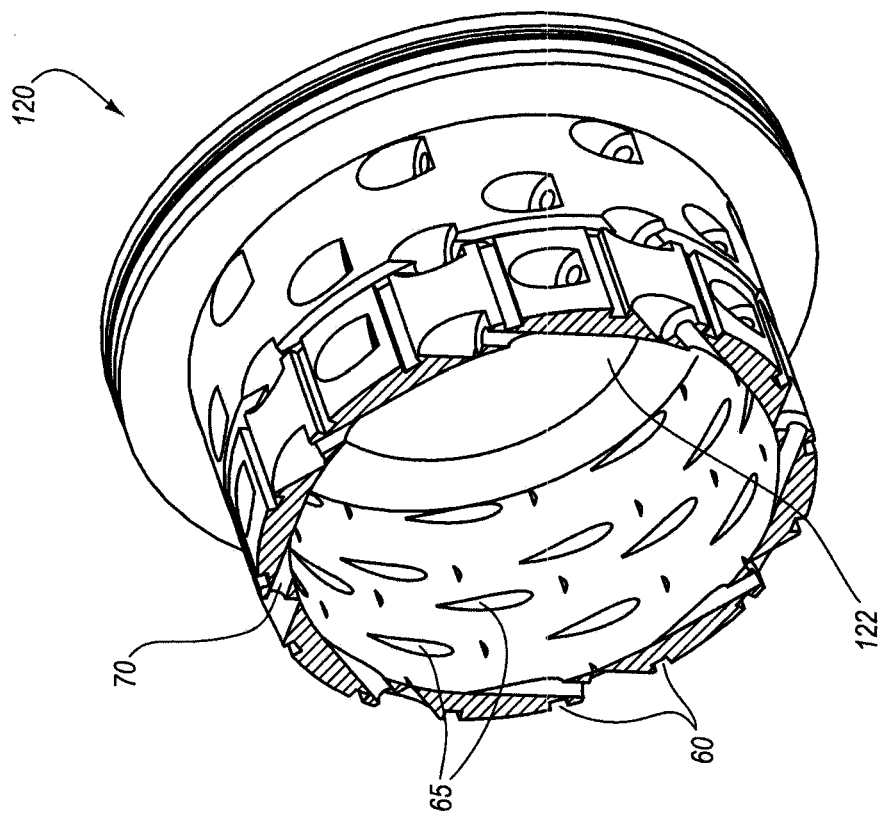
Figure 14:
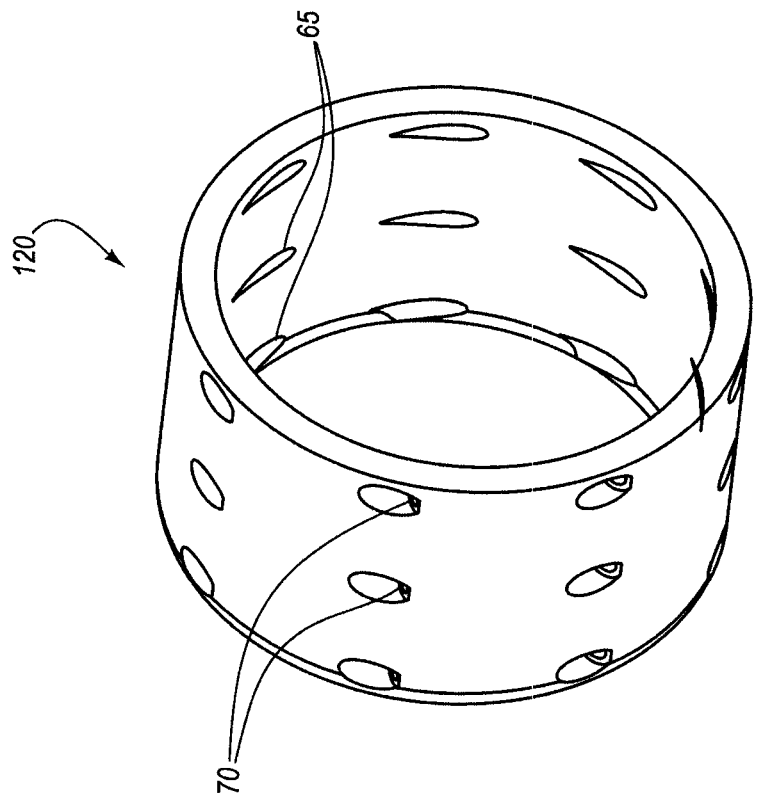
Figure 13:
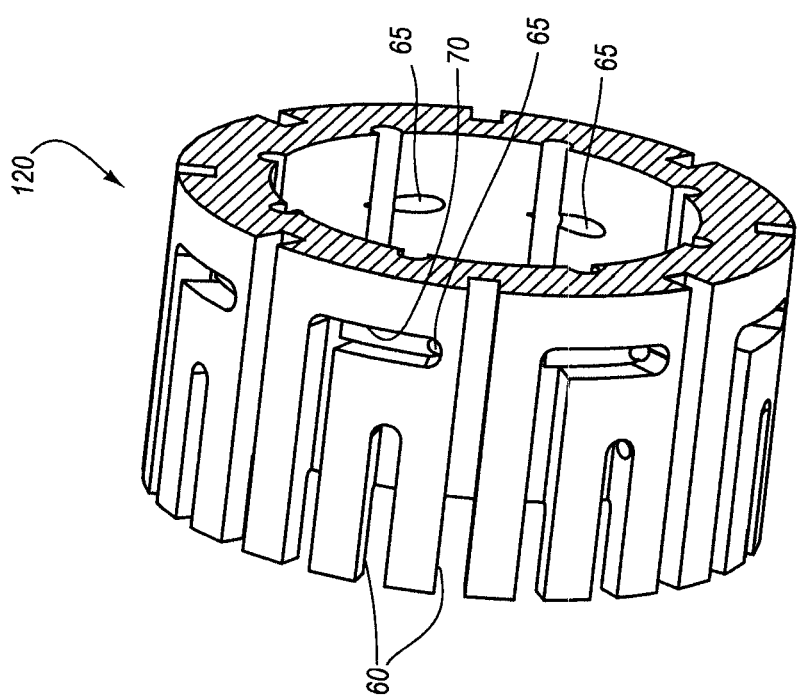

Referring to FIG. 11, there is illustrated a perspective view with a cross-section of v-cup 120 removed toward first end 15. From the inside of v-cup 120, outlet 122 toward second end 20 is visible. In addition, there are shown ports 65 as well as passageways 65 and rows 70 for directing airflow into the inside of cut 120. FIG. 12 provides a similar illustration of v-cup 120 as FIG. 11. In this view, outlet 122 is not visible, but ring 130 is provided in the groove at the end of v-cup 120 toward second end 20. FIG. 13 is another view in which the cross-sectional view looks within v-cup 120 toward first end 15. Passageways 60 and rows 70 leading to ports 65 are shown in FIG. 13. In one embodiment, v-cup 120 may include ports 65 in communication with rows 70 as illustrated in FIG. 14.

Figure 15:
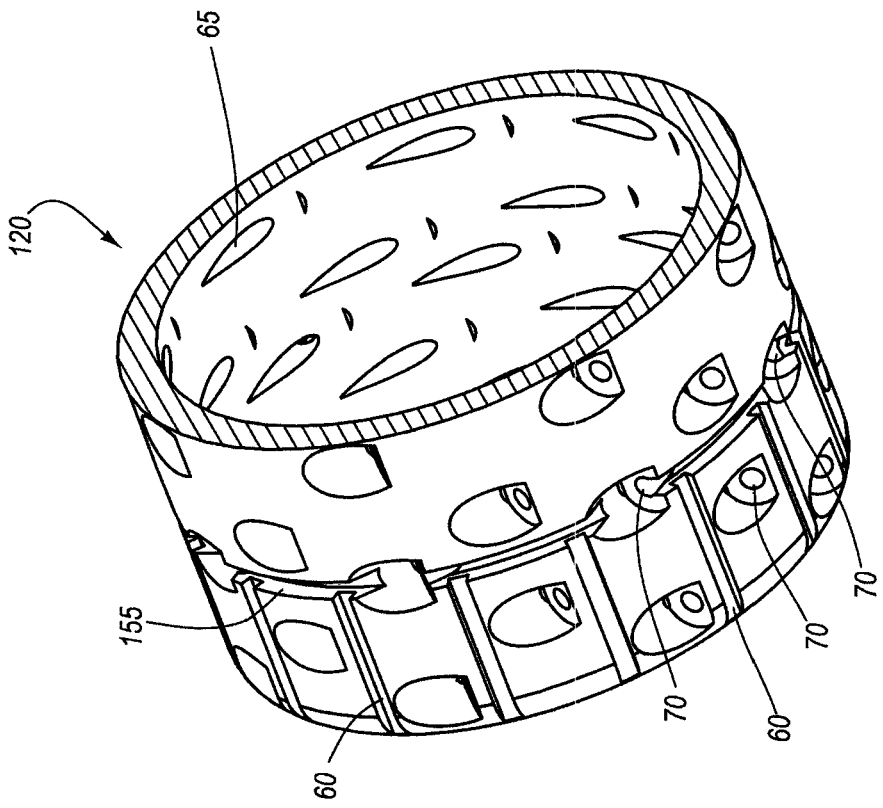

Looking at FIG. 15, and in one embodiment, an inside track 155 may be provided to feed tangential passageways 70 from passageways 60. With this configuration, a lower resistance v-cup 120 having either 5 rows or 3 rows of ports 65 may be provided.

Figure 16:
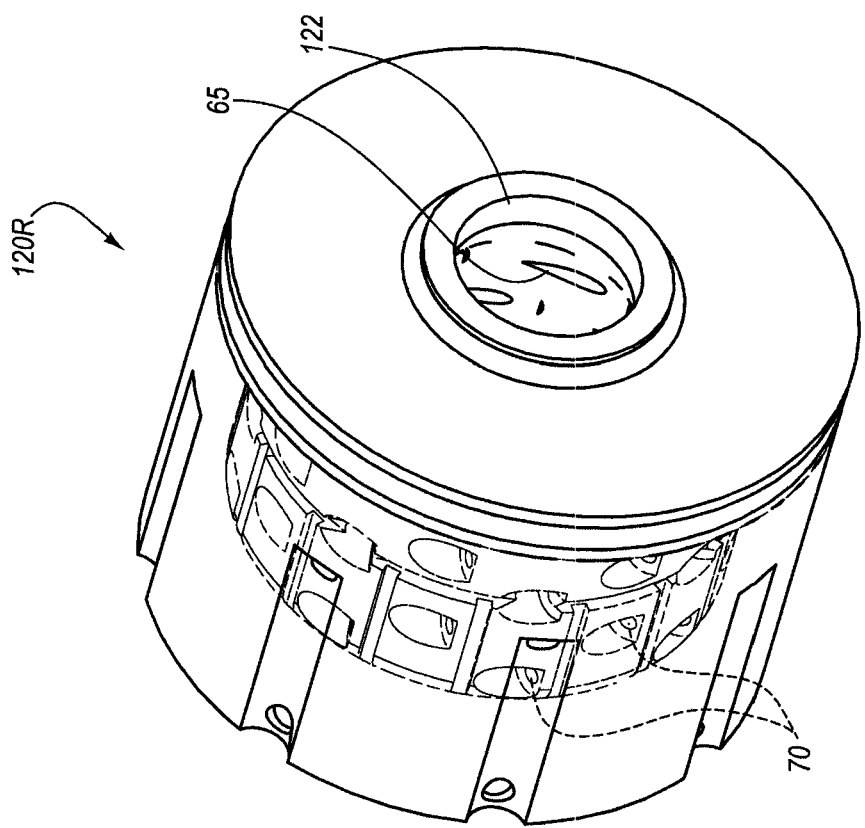
Figure 18:
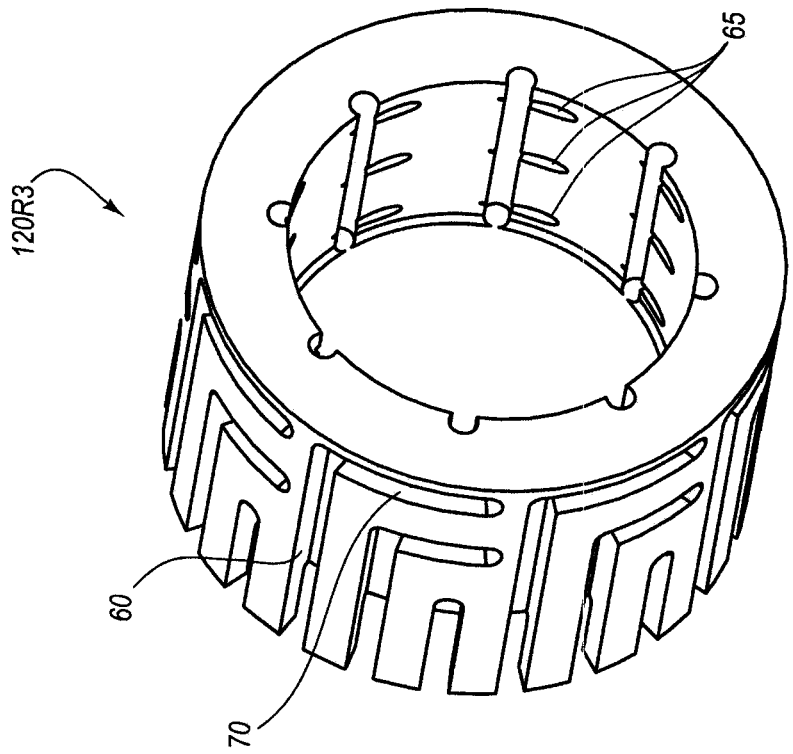
FIGS. 17-19 illustrate a three row v-cup from one of the chambers of the processing section of the desalinization apparatus shown in FIGS. 1-3.
Figure 17:
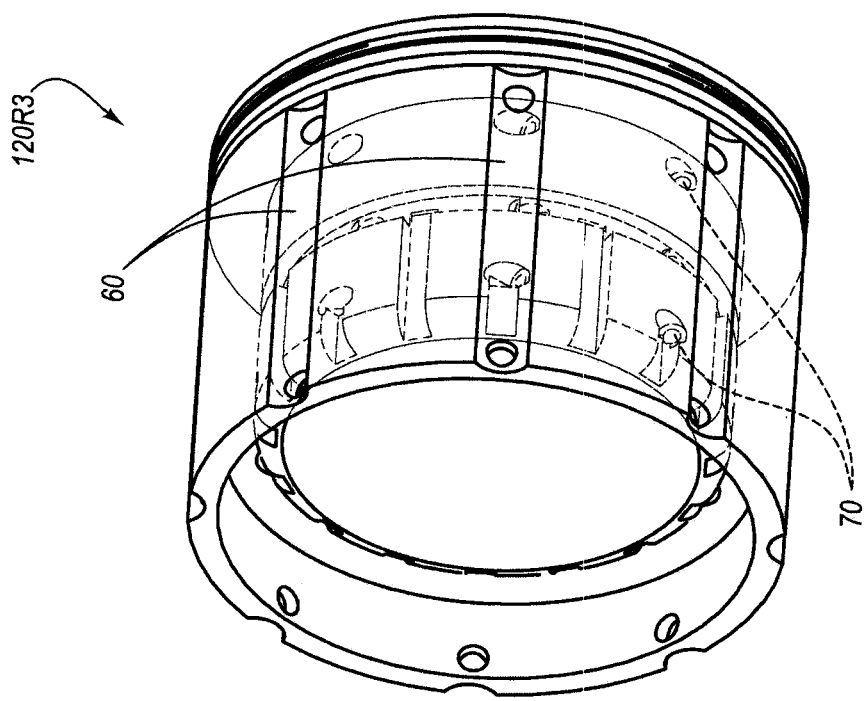
Figure 20:
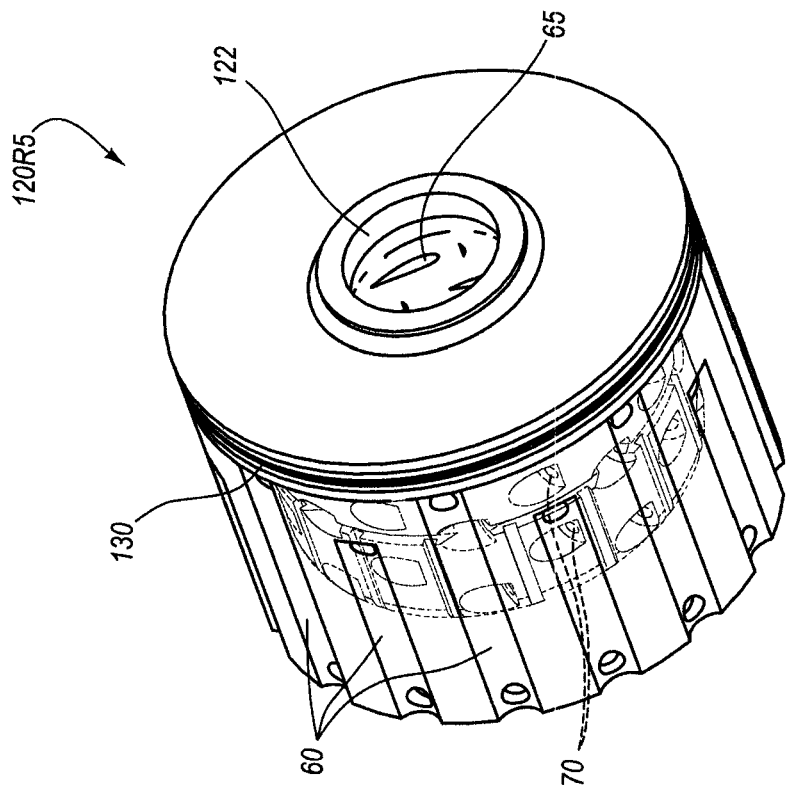
FIGS. 20 and 21 a five row v-cup from one of the chambers of the processing section of the desalinization apparatus shown in FIGS. 1-3.
Figure 19:
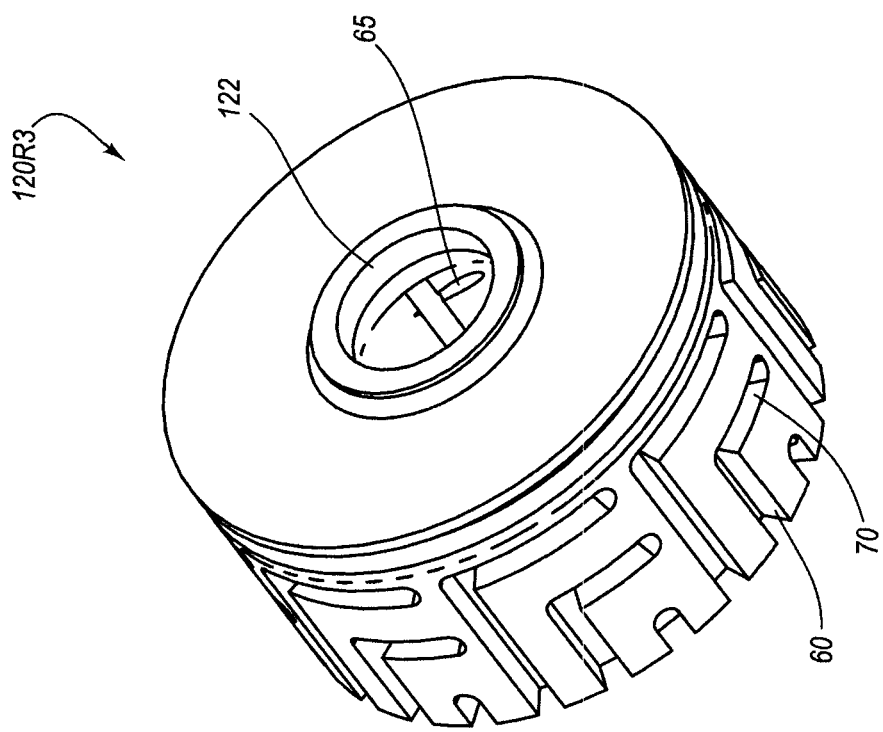

A restrictive v-cup 120R is illustrated in FIG. 16. A three row v-cup 120R3 is illustrated in FIGS. 17-19. A five row v-cup 120R5 is illustrated in FIGS. 20 and 22.

Figure 22:
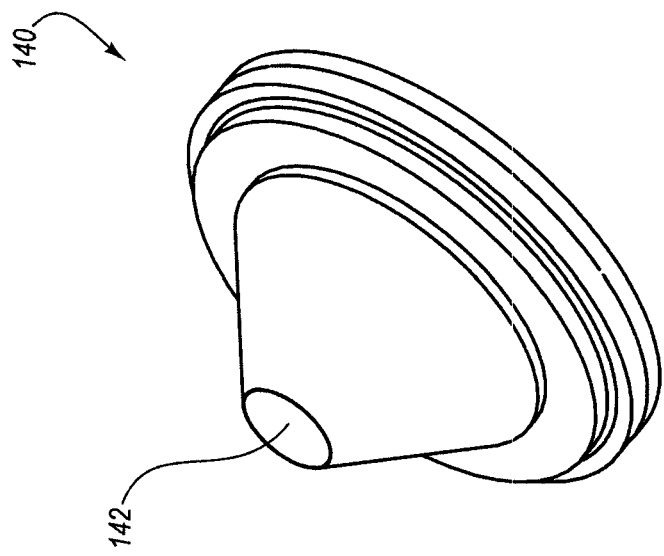
FIG. 22 illustrates a partition from one of the separation chambers of the separation section of the desalinization apparatus shown in FIGS. 1-3.
Figure 21:
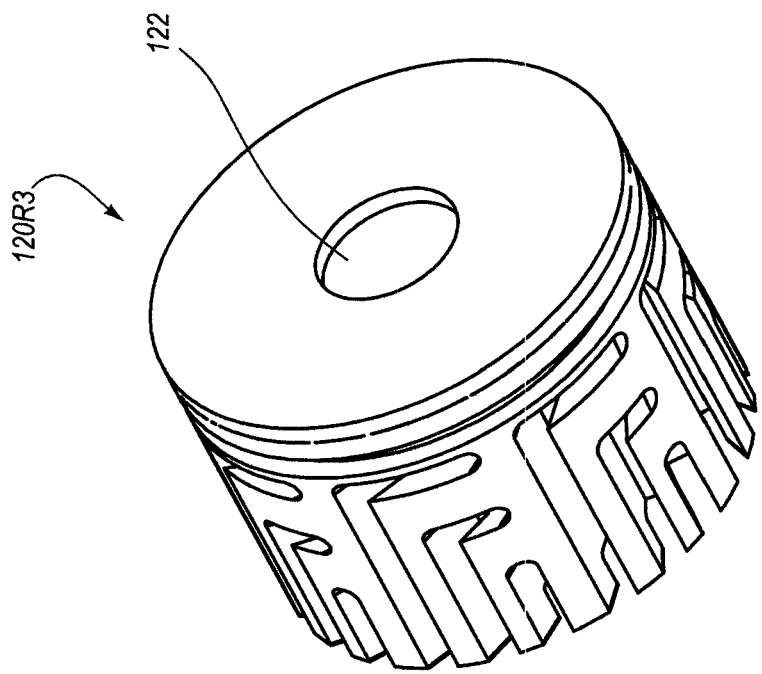

FIG. 22 is a perspective view of partition 140 with outlet 142 having a flange for preventing mixing and backflow of water vapor and other fluids and materials in a separation chamber.

Figure 23:
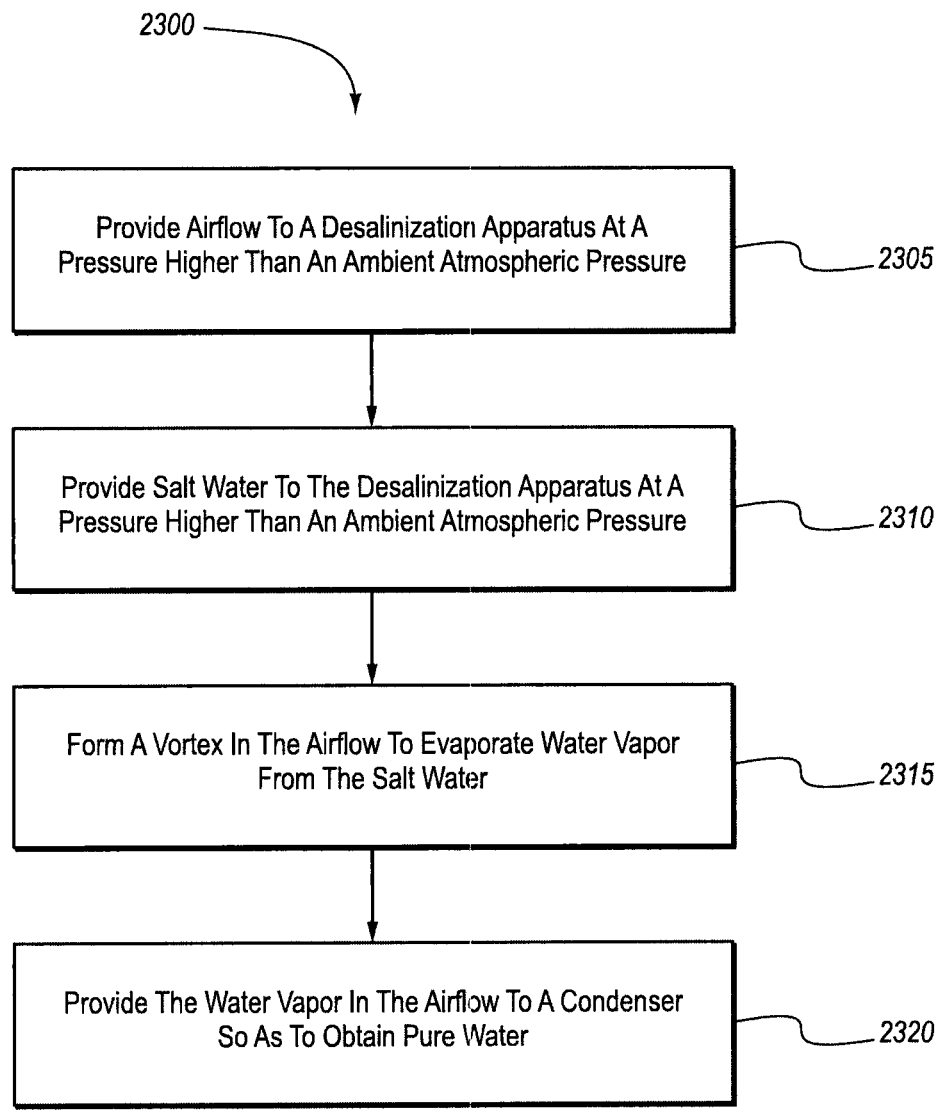
FIG. 23 is a schematic diagram of a desalinization process according to one embodiment of the invention.

Referring now to FIG. 23, there is shown an exemplary method 2300 related to desalinization of salt water. Method 2300 may include providing 2305 airflow to a desalinization apparatus at a pressure higher than an ambient atmospheric pressure. Method 2300 may further include providing 2310 salt water to the desalinization apparatus at a pressure higher than an ambient atmospheric pressure. Method 2300 may also include forming 2315 a vortex in the airflow to evaporate water vapor from the salt water. Method 2300 may include providing 2320 the water vapor in the airflow to a condenser so as to obtain pure water.

In an embodiment, method 2300 may include forming the vortex occurs in a chamber. For example, this may include forming a plurality of vortices in a plurality of chambers in series with one another prior to providing the water vapor in the airflow to the condenser.

Method 2300 may also include regulating flow of the airflow to the desalinization device. Airflow into the desalinization apparatus may be provided at a pressure of about 80 psi. Airflow into the desalinization apparatus may be provided at a volume of about 10 to 50 cfm. Airflow into the desalinization apparatus may be provided at a temperature of about 100° to 150° F.

Method 2300 may also include regulating flow of the salt water into the desalinization device. Salt water into the desalinization apparatus may be provided at a pressure of about 5 to 10 psi greater than the pressure of the airflow so as to provide a pressure differential to allow the salt water to enter the airflow. Using the above-identified specifications, for example, the desalinization apparatus may provide at least 10 ml per minute of water from the pure water vapor. However, the desalinization apparatus may provide at least 13.5 ml per minute of water from the pure water vapor.

What is claimed is:

1. A water purification apparatus, comprising:
    a first end and a second end in opposition to one another, a line between the first end and the second end forming an axis;
    at least one first port formed in the first end for receiving airflow therethrough and at a pressure higher than an ambient atmospheric pressure to form a vortex flow;
    at least one second port formed in the first end for receiving salt water therethrough and at a pressure higher than the ambient atmospheric pressure, the salt water being directed into the vortex flow;
    at least one first output formed in the second end for providing outflow of purified water vapor;
    at least one second output formed in the second end for providing outflow of a mixture of water, salt and air;
    a plurality of passageways arranged substantially parallel to the axis;
    a plurality of processing chambers configured to evaporate the salt water into the airflow, the processing chambers being arranged in series along the axis, at least one of the passageways being arranged surrounding each processing chamber, each processing chamber comprising:
        a plurality of chamber ports in communication with the plurality of passageways, the plurality of chamber ports being arranged in a plurality of rows substantially parallel to one another and substantially perpendicular to the axis, the plurality of chamber ports providing an inlet for water, salt, air, and purified water vapor into each processing chamber;
        a chamber outlet providing an outlet for water, salt, air, and purified water vapor from each chamber, the chamber outlets being arranged coaxially along the axis, the chamber outlet of at least one of the processing chambers being connected in flow communication with one of the passageways surrounding an adjacent one of the processing chambers;
    at least one tube casing extending between the first end and the second end, the at least one tube casing enclosing the plurality of processing chambers.

2. A water purification apparatus according to claim 1 wherein the first end includes an input body having an airflow connector, a fluid connector, and a valve assembly, wherein the airflow connector is configured to receive tubing for the airflow provided thereto, wherein the fluid connector is configured to receive tubing for the saltwater provided thereto, and wherein the valve assembly is configured to regulate flow of the saltwater provided thereto.

3. A water purification apparatus according to claim 2 wherein the airflow connector is configured to provide the airflow at a pressure of about 80 psi.

4. A water purification apparatus according to claim 2 wherein the airflow connector is configured to provide the airflow at a volume of about 10 to 50 cfm.

5. A water purification apparatus according to claim 2 wherein the airflow connector is configured to provide the airflow at a temperature of about 100° to 150° F.

6. A water purification apparatus according to claim 2 wherein the fluid connector is configured to provide the salt water at a pressure of about 5 to 10 psi greater than the pressure of the airflow so as to provide a pressure differential to allow the salt water to enter the airflow.

7. A water purification apparatus according to claim 1 wherein the second end provides at least 10 ml per minute of water from the purified water vapor.

8. A water purification apparatus according to claim 1 wherein the second end provides at least 13.5 ml per minute of water from the purified water vapor.

9. A water purification apparatus according to claim 1 wherein the at least one output for providing outflow of purified water vapor includes an airflow connector is configured to provide the water vapor to a passageway in communication with a refrigerator to condense the water vapor into salt-free water.

10. A water purification apparatus according to claim 1 wherein the at least one output for providing outflow of a mixture of water, salt and air is configured to provide the mixture to a separator bottle to further process the mixture into salt-free water.

11. A water purification apparatus according to claim 1 wherein the at least one tube casing includes a processing section and a separator section in fluid communication with one another, the processing section is configured to receive airflow and salt water from the first end, the processing section is configured to evaporate at least a portion of the salt water prior to the separator section, and the separator section is configured to discharge water vapor to a passageway in communication with a refrigerator to condense the water vapor into salt-free water and discharge a mixture of water, salt and air separate from the passageway in communication with the refrigerator.

12. A water purification apparatus according to claim 11 wherein the processing section directs the airflow through the chamber ports to form the vortex flow about the axis so as to evaporate water vapor from the salt water into the airflow.

13. A water purification apparatus according to claim 11 wherein the plurality of chambers forming the processing section includes different cup configurations, and the different cup configurations are selected from a group consisting of a restrictive v-cup, a 3 row v-cup and a 5 row v-cup.

14. A water purification apparatus according to claim 13 wherein the restrictive v-cup is configured to create a pressure drop of the airflow and the salt water therein so as to increase pressure prior to the restrictive v-cup toward the first end and allow the airflow to hold additional water vapor.

15. A water purification apparatus according to claim 11 wherein the processing section and the separator section are each configured to create a pressure drop of about 0.75 to 4 psi in at least one of the plurality of chambers.

16. A water purification apparatus according to claim 11 wherein the processing section is configured to maximize evaporation of the salt water prior to the separator section.

17. A water purification apparatus according to claim 11 wherein the separator section is configured to prevent salt from being discharged from the at least one output for providing outflow of purified water vapor.

18. A water purification apparatus according to claim 11 wherein the processing section is configured to provide additional evaporation of the salt water prior to the second end.

19. A water purification apparatus, comprising:
a first end and a second end in opposition to one another, a line between the first end and the second end forming an axis;
at least one first port formed in the first end for receiving airflow therethrough and at a pressure higher than an ambient atmospheric pressure;
at least one second port formed in the first end for receiving salt water therethrough and at a pressure higher than the ambient atmospheric pressure;
at least one first output formed in the second end for providing outflow of purified water vapor;
at least one second output formed in the second end for providing outflow of a mixture of water, salt and air;
a plurality of chambers for evaporating the salt water into the airflow;
a plurality of passageways formed by at least one of the plurality of chambers and arranged substantially parallel to the axis between the first end and the second end;
a plurality of chamber ports in communication with the plurality of passageways, the chamber ports being arranged in a plurality of rows substantially parallel to one another and substantially perpendicular to the axis between the first end and the second end;
at least one tube casing extending between the first end and the second end, the tube casing enclosing the plurality of chambers;
wherein the at least one tube casing includes a processing section and a separator section in fluid communication with one another, the processing section is configured to receive airflow and salt water from the first end, the processing section is configured to evaporate at least a portion of the salt water prior to the separator section, and the separator section is configured to discharge water vapor to a passageway in communication with a refrigerator to condense the water vapor into salt-free water and discharge a mixture of water, salt and air separate from the passageway in communication with the refrigerator;
wherein the plurality of chambers forming the processing section includes different cup configurations, and the different cup configurations are selected from a group consisting of a restrictive v-cup, a 3 row v-cup and a 5 row v-cup.

20. A water purification apparatus according to claim 1, further comprising a processing section and a separating section, the processing section including the plurality of passageways and the plurality of processing chambers, the separating section including a plurality of separating chambers, the separating chambers being separated by partitions having a centrally located opening aligned with the axis.

21. A water purification apparatus according to claim 1, wherein the chamber outlets comprise a v-cup structure.

22. A water purification apparatus, comprising:
a first end and a second end in opposition to one another, a line between the first end and the second end forming an axis;
at least one first port formed in the first end for receiving airflow therethrough and at a pressure higher than an ambient atmospheric pressure;
at least one second port formed in the first end for receiving salt water therethrough and at a pressure higher than the ambient atmospheric pressure;
at least one first output formed in the second end for providing outflow of purified water vapor;
at least one second output formed in the second end for providing outflow of a mixture of water, salt and air;
a plurality of chambers for evaporating the salt water into the airflow;
a plurality of passageways formed by at least one of the plurality of chambers and arranged substantially parallel to the axis between the first end and the second end;
a plurality of chamber ports in communication with the plurality of passageways, the chamber ports being arranged in a plurality of rows substantially parallel to one another and substantially perpendicular to the axis between the first end and the second end;
at least one tube casing extending between the first end and the second end, the tube casing enclosing the plurality of chambers;
wherein the first end includes an input body having an airflow connector, a fluid connector, and a valve assembly, wherein the airflow connector is configured to receive tubing for the airflow provided thereto, wherein the fluid connector is configured to receive tubing for the saltwater provided thereto, and wherein the valve assembly is configured to regulate flow of the saltwater provided thereto.

23. A water purification apparatus according to claim 19, wherein the restrictive v-cup is configured to create a pressure drop of the airflow and the salt water therein so as to increase pressure prior to the restrictive v-cup toward the first end and allow the airflow to hold additional water vapor.

* * * * *